F. A. PRATT.
TOOL REST FOR TURNING LATHES.
No. 36,479. Patented Sept. 16, 1862.
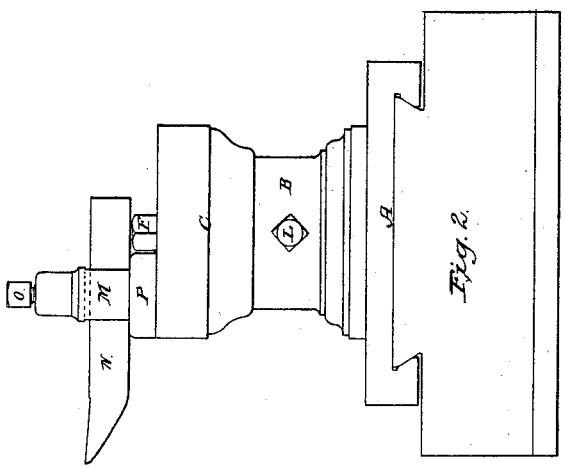
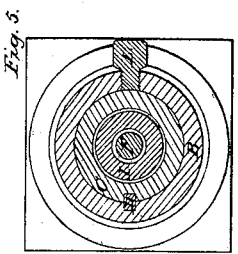
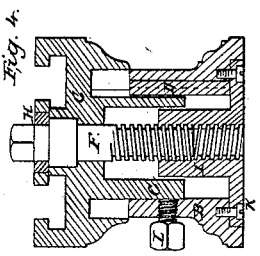
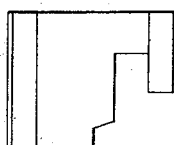
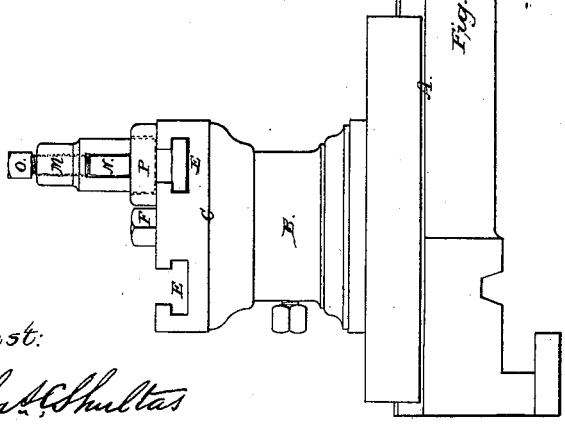
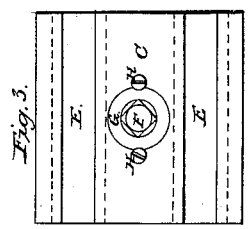
Attest:
Inventor:
Francis A. Pratt

UNITED STATES PATENT OFFICE.

FRANCIS A. PRATT, OF HARTFORD, CONNECTICUT.

TOOL-REST FOR TURNING-LATHES.

Specification of Letters Patent No. 36,479, dated September 16, 1862.

*To all whom it may concern:*

Be it known that I, FRANCIS A. PRATT, of the city and county of Hartford, in the State of Connecticut, have invented certain new and useful Improvements in the Tool-Rests of Turning-Lathes; and I do hereby declare that the following is a full, clear, and exact description of the same, reference being had to the accompanying drawings, making part of this specification, in which—

Figure 1 is a front elevation of the feed carriage of a turning lathe with my improved tool rest applied thereto, Fig. 2 is an end elevation of the same, Fig. 3 is a plan view of the tool rest, Fig. 4 is a vertical section through the center of the apparatus, and Fig. 5 is a transverse section at the line X, Y, (Fig. 4,).

Similar letters of reference denote the same part in the several figures.

My invention relates to that part of the slide rest of a turning lathe which supports the clamp in which the cutting tool is held, and which by an adjustment for vertical movement permits the height of the tool's point to be varied as may be required.

Prior to my invention the tool clamps of turning lathes have been so fastened upon rocking or jointed rests that the point of the tool, when not in a position directly over the joint upon which the rest rocks, may receive a vertical adjustment by a rocking of the said rest; but when the work requires that the point or cutting part of the tool must be set directly over the axis of the rocking rest, no vertical movement can be given to the tool's edge by the described rocking movement; and in all cases with this arrangement, the vertical adjustment of the tool's edge is accompanied by an objectionable lateral displacement of the same. Arrangements have also been used in which the tool is supported upon beveled or threaded collars which surround the tool-post and by the turning of which the tool's point can be raised or lowered, the tool when properly adjusted being tightly clamped against the collars by a set screw in the post. This arrangement requires that the tool must be loosened when any change in its vertical adjustment is made, and this is objectionable on account of the derangement of its setting which may occur when it is thus loosened.

The object of my invention is to produce a tool rest in which there may be given to the tool a vertical adjustment in a perpendicular line without loosening the tool in its clamp or deranging its setting.

To this end my invention consists; in the employment in combination with the feed carriage of a turning lathe of a movable tool clamp carrier the movements of which are confined to a straight line by a vertical guide, and which is adjusted to the proper height by an adjusting screw which is independent of the clamp in which the tool is held. And my said invention also consists, in the employement in connection with the feed carriage having a vertically moving tool clamp carrier, as described, of a set screw for clamping the carrier in its guide, in combination with the adjusting screw by which the carrier is moved; substantially in the manner hereinafter set forth and for the purpose specified.

To enable others to make and use my invention I will proceed to description thereof.

In the accompanying drawings A (see Figs. 1 and 2) is the feed carriage of a turning lathe to the top surface of the upper slide of which is bolted the flange of the base piece or guide, B, of the tool rest. The body of this base piece B, is of cylindrical form and is bored straight through and through from top to bottom, and within it slides the lower cylindrical portion of the adjustable part C, or as I term it the "carrier," of the tool rest, which enters the guide B far enough to insure its being properly guided in a straight line. The carrier is prevented from turning in B by a straight feather, D, which enters a groove in the side of C.

The upper part of the carrier C, is in the form of a square table in the upper surface of which are two parallel grooves E wider at the bottom than at the surface, in any part of either of which grooves the tool post may be fastened.

F is a screw by which the vertical movements of the carrier C may be effected. A collar on the upper part of the screw F enters a recess in the top surface of the carrier and is confined therein, free to turn but not to move endwise, by a washer G held in place by screws H. The body of the adjusting screw F, extends down through the cylindrical part of the carrier, which is hollow, and its lower threaded portion enters a nut I, which is secured by its flange K, to the bottom of the base piece or guide B; the cylindrical portion of the said nut extends up into the bore of the base piece and into the hollow of the cylindrical part of C, far enough to allow to the screw F, the required range of movement. The head of the adjusting screw F, projects above the top surface of the carrier, far enough to be conveniently seized and operated by a wrench.

The carrier C, when adjusted to the proper height is firmly clamped in place by a set screw L, which is screwed into the side of B, and presses against the cylindrical part of the carrier.

M, is the tool post or clamp in which the tool N, is held. This tool clamp may be of any suitable form and may be secured to the carrier C, in any desirable way but the form which I prefer is that of the common tool post as shown in the drawings, in which the tool is pressed by a set screw O, against a loose collar P, which surrounds the tool post and is forced against the surface of the carrier, thus also fastening the tool post the lower grooved end of which enters the groove E, and catches under its edges. The collar P, must be of such thickness that the tool will clear the head of the adjusting screw F.

The adjusting screw F, by which the vertical adjustments of the tool are effected, being independent of the tool clamp, the height of the tool's edge may be varied without loosening the tool in its clamp or deranging its setting and this adjustment may even be made while it is cutting; the tool also may be loosened in its clamp, moved to any position, be removed and replaced without disturbing the adjustment by which its height is regulated. As all parts of the carrier C, move in perpendicular lines, the cutting part of the tool N, can receive the same amount of vertical adjustment in whatever position it may be fixed.

Having thus described a mode of putting my invention in practice, I do not wish to be understood to limit my claim to the peculiar form of the parts herein described.

What I claim as my invention and desire to secure by Letters Patent of the United States is;

1. The combination with the feed carriage of a turning lathe of a vertically movable tool clamp carrier, a vertical guide so arranged as to confine the movements of all parts of the carrier in perpendicular lines, and an adjusting screw, independent of the tool clamp, for moving the carrier; substantially in the manner and for the purpose hereinbefore set forth.

2. I also claim, the combination with the movable tool clamp carrier, its described vertical guide, and its independent adjusting screw, of the set screw L, so arranged as to clamp the carrier in its guide; substantially as hereinbefore described; for the purpose set forth.

FRANCIS A. PRATT.

Witnesses:
GEO. S. GILMAN,
CHAS. C. SHULTAS.